United States Patent [19]

Mullhaupt et al.

[11] Patent Number: 4,477,418

[45] Date of Patent: Oct. 16, 1984

[54] PROCESS FOR ADSORPTION

[75] Inventors: Joseph T. Mullhaupt, Williamsville; Oren E. Berwaldt, Youngstown, both of N.Y.

[73] Assignee: Union Carbide Corporation, Danbury, Conn.

[21] Appl. No.: 525,716

[22] Filed: Aug. 23, 1983

[51] Int. Cl.$^3$ ............................................. C01B 13/00
[52] U.S. Cl. .................................... 423/219; 423/210
[58] Field of Search ................................ 423/219, 210

[56] References Cited

U.S. PATENT DOCUMENTS 4,323,543 6/1982 McAuliffe ............................ 423/219
4,338,288 6/1982 Rollmann ....................... 423/210 M

OTHER PUBLICATIONS

Miyata & Hirose, "Adsorption of $N_2$, $O_2$, $CO_2$ and $H_2$ on Hydrotalcite-Like System: $Mg^{+2}$—$Al^{+3}$—($Fe(CN)_6)^{4-}$, pp. 441-445, *Clays & Clay Minerals*, vol. 26, No. 6 (1978).

Cartraud, "Zeolitic Properties of $K_2Zn_3[Fe(CN)_6]_2 \cdot xH_2O$", *J. Chem. Soc., Farraday Trans.* 1, 77, pp. 1561-1567 (1981).

*Primary Examiner*—Peter D. Rosenberg
*Attorney, Agent, or Firm*—Saul R. Bresch

[57] ABSTRACT

In a process for the separation of oxygen from a gas stream by adsorption, the improvement comprising using, as the adsorbent, a compound have the formula $M_x[M'(CN)_6]_y$ wherein M is an element having an atomic number of 21, 25 to 30, 39, 50, or 57 to 59;

M' is an element having an atomic number from 24 to 27; and x and y are positive whole numbers such that the sum of the valence of M times x plus the valence of $[M'(CN_6)]$ times y is equal to zero.

5 Claims, No Drawings

PROCESS FOR ADSORPTION

TECHNICAL FIELD

This invention relates to a process for the adsorption of oxygen from gas streams using a transition metal hexacyano compound as the adsorbent.

BACKGROUND ART

Gas separations utilizing solid adsorbent materials are well known, particularly those in which naturally occurring and synthetic zeolites are used. The synthetic zeolites are especially adapted to gas separations based on the size of the gas molecule.

A number of different synthetic zeolites have been formulated and are commercially available for gas separations. For example, such molecular sieve adsorbent materials are commonly used to remove high boiling impurities such as water vapor and carbon dioxide upstream of further processing. Such usage is common for pretreatment of natural gas feedstocks and precleanup of air prior to cryogenic separation. Other applications include the upgrading of refinery process streams such as recycle hydrogen streams. Additionally, other zeolites are commonly used in adsorption processes to separate air. Such zeolites are utilized in either pressure swing or temperature swing adsorption processes, although the pressure swing processes are generally preferred. These zeolites are typically nitrogen selective, that is, the nitrogen component of the air stream is adsorbed preferentially to the oxygen component. As a result, the nitrogen component is loaded onto the adsorbent bed whereas the oxygen component tends to remain in the gas phase. Although the zeolite molecular sieve adsorbent materials are effective materials for separating air, they have one significant drawback. That drawback is related to the fact that by nature of their nitrogen selectivity, it is the major component of air that is adsorbed rather than the minor oxygen component. Since air composition is nominally 78 percent nitrogen, nitrogen selectivity for the adsorbent results in large adsorbent material requirements for such a separation process. It would be advantageous, therefore, for a separation process to adsorb oxygen rather than nitrogen and thereby reduce the adsorbent material requirements.

The potential advantage of oxygen selective processes has been recognized and, for this purpose, oxygen selective carbon-type molecular sieve adsorbents have been made available. This type of adsorbent is rate selective, however. Consequently, these materials are necessarily used in nonequilibrium process cycles that maximize sorption rates of oxygen with respect to those of nitrogen. This, in turn, requires the use of rapid cycles, for example, cycles of about one minute in duration, which restricts cycle design to pressure swing adsorption processes and have relatively high power requirements.

Thus, there is a need for adsorbent processes which are both oxygen selective and non-rate selective.

DISCLOSURE OF THE INVENTION

An object of this invention, then, is to provide a versatile adsorption process advantageously adaptable to conventional pressure or temperature swing separations.

Other objects and advantages will become apparent hereinafter.

According to the present invention, an improvement has been discovered in a process for the separation of oxygen from a gas stream by adsorption. The improvement comprises using, as the adsorbent, a compound having the formula:

$$M_x[M'(CN)_6]_y$$

wherein M is an element having an atomic number of 21, 25 to 30, 39, 50, or 57 to 59;

M' is an element having an atomic number from 24 to 27; and x and y are positive whole numbers such that the sum of the valence of M times x plus the valence of [M'(CN)$_6$] times y is equal to zero.

DETAILED DESCRIPTION

The transition metal hexacyano compounds defined above are, among other thins, known pigments and catalysts as shown, for example, in U.S. Pat. Nos. 3,094,379 and 3,278,457, respectively. The characteristic of being an oxygen selective adsorbent is not recognized, however. As will be apparent from the atomic numbers, M can be any of the elements including scandium, manganese, iron, cobalt, nickel, copper, zinc, yttrium, tin, lanthanum, cerium, or praseodymium and M' can be any of the elements, chromium, manganese, iron, or cobalt. The formula subscripts x and y are chosen to form neutral molecules.

Preferred adsorbent compounds are $Zn_2[Fe(CN)_6]$, $Zn_3[Fe(CN)_6]_2$, and $Ce[Fe(CN)_6]$. The $Zn_2[Fe(CN)_6]$ is characterized by good loading and a high separation factor although its gas adsorption rate is relatively low. The $Zn_3[Fe(CN)_6]_2$ compound is characterized by good loading and fast gas adsorption rates although its separation factor is moderate. The $Ce[Fe(CN)_6]$ has a separation factor between those of the two zinc compounds, and its oxygen loading is much higher than those of either zinc compound. The rates of $Ce[Fe(CN)_6]$ are similar to those of $Zn_2[Fe(CN)_6]$. The choice of adsorbent material will depend not only on the loading, ratio and separation factor, but also on the application.

The separation method can utilize a pressure swing adsorption process whereby the oxygen-containing gas feed stream is contacted with the adsorbent bed material, which adsorbs at least some of the oxygen component and discharges an oxygen-depleted gas stream from the adsorbent bed. The adsorbent bed can be regenerated by reducing the pressure on the bed and thereby removing the oxygen-rich adsorbate. In a similar fashion, adsorbent material can be utilized in temperature swing adsorption processes whereby the feed gas stream containing the oxygen is passed through the adsorbent bed at a low temperature allowing at least some of the oxygen component to be adsorbed on the bed and discharging an oxygen-depleted gas stream from the adsorbent bed. The adsorbent bed can then be regenerated by raising the temperature of the bed to drive off the oxygen-rich adsorbate. Both the pressure swing and temperature swing adsorption processes are, aside from the adsorbent taught in this specification, conventional insofar as process steps are concerned. Conventional process conditions can also be applied here although preferred conditions may vary somewhat with the feed gas and from those utilized with other adsorbents. Thus, with air as the feed gas in the pressure swing mode, pressures can be in the range of about 0.01 atmosphere to about 100 atmospheres, but are preferably in the range of about 1 to about 30 atmospheres for adsorption with adsorbent regeneration being carried out at about atmospheric pressure. The temperature range for the pressure swing cycles is about 150° K. to about 350° K. and is preferably in the range of about 290° K. to about 340° K. In the temperature swing mode, temperatures can be in the range of about 195° K. to about 373° K. and are preferably in the range of about 273° K. to about 373° K. Optimum temperatures are about ambient for adsorption and in the range of about 333° K. to about 366° K. for adsorbent regeneration. In general, all of the available adsorption processes can be used together with the transition metal hexacyano compounds defined above. Examples of this adsorption technology may be found in U.S. Pat. Nos. 2,944,627; 3,024,867; and 3,636,679.

The invention is illustrated by the following examples.

EXAMPLES

The physical properties of some hexacyano adsorbents are set forth in Table I.

The sorptive properties of the hexacyano compounds referred to herein are determined by two types of experimental methods: (i) for individual gases, a gravimetric technique and (ii) for mixed gases, a volumetric technique.

The heart of the gravimetric system is the Sartorius pressure microbalance. The microbalance beam is a quartz rod suspended from and controlled by an electromechanical null balancing device. The beam, buckets, and suspension wires are enclosed in a stainless steel housing capable of withstanding pressures of up to 2000 pounds per square inch (psi). The extreme sensitivity (0.1 microgram on the 1.4 milligram scale) and the small sample requirement (2.5 gram maximum load) make the gravimetric apparatus ideal for measuring single points for rapid screening or for obtaining isotherms over a wide range of pressures. Signals from the null balancing device are presented in two ways. A direct digital readout with automatic taring provides a running measure of the mass at any given time, and an analog record of mass as a function of time provides a permanent record.

A further description of the gravimetric apparatus is as follows: the microbalance scale is connected to a gas supply and a vacuum outlet. Control valves are used to regulate gas flow. Experimental data obtained include gas pressure and temperature at the sample, as well as mass changes due to uptake or release of gas. The microbalance includes a steel housing that is partly enclosed in a temperature bath. The sample is contained in a receptacle within the temperature bath whereas the sample counterweight is kept at ambient conditions.

The gas handling part of the gravimetric system is designed to provide known gas pressures in the range of about 1 micron to about 500 psi. Superatmospheric pressures of individual gases are obtained from cylinders through a manifold. Subatmospheric pressures are produced through a vacuum system that includes vapor traps as well as vacuum pumps. A controlled temperature environment is provided for the sample side of the microbalance by three different devices. For temperatures well above ambient, such as those used in activation, less than or equal to 250° C., a tube furnace is placed around the sample arm. For temperatures near ambient, the sample side is immersed in an oil bath. For temperatures well below ambient, cryogenic baths are used. The temperature of the sample is measured by a thermocoupled placed within 1 centimeter of the sample bucket inside the sample chamber. Near ambient, the temperature can be controlled within ±0.5° C. and measured to within ±0.1° C.

The balance is loaded with sample (about 0.5 gram) and counter-balance materials through gasketed closures in the respective chanbers. Usually, nonporous glass beads serve as the counter-balance material. The sample to be tested can be in powder or compacted form, e.g., crushed filter cake is often used after this material is screened through 20 onto 40 mesh. After the chambers are closed, the system is carefully evacuated at ambient temperature. Then, the sample temperature is raised under vacuum to some predetermined level to "activate" it for adsorption, that is, to remove sorbed gases, vapors, or water of hydration, to prepare the sample for adsorption. Activation temperatures in the range of about 100° to about 250° C. can be used. The most commonly used temperatures are in the range of about 160° C. to about 190° C. After the sample reaches constant weight at the activation temperature, the sample temperature is brought to the value desired for adsorption measurements.

Sorption measurements are most frequently made at constant temperature. The adsorption of gas is measured by admitting gas rapidly to some fixed pressure and following the increase in weight with time. Pressure equalization is usually achieved within 20 seconds; the time to reach adsorption equilibrium may require minutes or days. The constant weight criterion is used with a slope of less than 2 micrograms in 5 minutes accepted as "zero". The desorption of gas is measured in a similar way by decreasing the pressure to some fixed value. Frequently, desorption is performed by simply pumping on the sample. Tests for equilibrium values are usually made by repeating the point on adsorption after an intervening desorption from the value to be tested. However, occasional tests are made by approaching the test value from both directions. Isobaric measurements have also been made by raising and lowering the sample temperature, but this is not as convenient as the isothermal pressure swing technique.

The pressures of interest here are greater than 10 torr, so that thermomolecular effects need not be considered. However, as the pressures increase above values of 1 atmosphere, bouyancy effects must be considered in establishing the correct adsorbed weight. The counter-balance automatically corrects for most of the buoyancy when both arms of the balance are at the same temperature. When the sample temperature is different from that of the counterbalance, differences in gas density magnify any difference in the volume of gas displaced. To calculate buoyancy effects, the sample is exposed to helium at the same temperatures and pressures used in the isotherm measurements. From the displacements observed in helium, the corrections to the observed weights are determined after accounting for differences in molecular weight.

The volumetric system is used for adsorption measurements with gas mixtures such as synthetic air. These experiments involve three main stages: (1) the establishment of equilibrium between a flowing gas mixture and a bed of activated adsorbent, (2) the retrieval of all the gas from the isolated equilibrated adsorbent bed, and (3) the analyses of the mixtures in the gas and adsorbed phases in the adsorber. The apparatus has four main sections, identified by function. The adsorber itself is a stainless steel tube having a volume of about 33 cubic centimeters fitted with porous frits to retain adsorbent material. It is mounted inside an oven (with forced air circulation) that provides temperatures from ambient to 343° C. within ±1° C. An internal thermocouple mounted on the adsorber axis can measure bed temperatures to ±0.1° C.

The gas handling portion of the volumetric system is designed to provide controlled, measured gas flows up to several hundred cubic centimeters per minute at pressures in the range of about 1 to about 7 atmospheres. Both helium and synthetic air are provided by the manifold, and chromatographic valves are employed to permit easy switching and sampling of the gas streams. To reduce dead space volumes, 1/16 inch diameter stainless steel tubing is used. The third section of the apparatus is a manifold for cryopumping gas from the adsorber, mixing it, and providing it for analysis. The cryopump is simply a bulb containing activated silica gel, which has negligible adsorptive capacity for either oxygen or nitrogen at ambient conditions. At liquid nitrogen temperature, silica gel is relatively nonselective and has high capacities for both oxygen and nitrogen. By heating the adsorber and cooling the cryopump, essentially all of the gas in the adsorber isolated at equilibrium can be removed. For example, residual pressures of about 1 to about 2 microns at about 100° C. to about 200° C. are easily obtained. In the fourth section, the gas phase in the adsorber at equilibrium and the total gas pumped from the adsorber are analyzed chromatographically. A chromatograph, fitted with molecular sieve zeolite columns, is used in conjunction with an integrator. Standard chromatographic techniques are employed. Estimates of the errors have been made from analyses of error sources and by measuring zeolites with known properties. Total loading can be determined to within ±0.01 millimol per gram or ±0.03 weight percent air. The composition of the adsorbed gases can be determined within ±0.0013 millimol per gram for either oxygen or nitrogen, corresponding to an error in the separation factor of ±0.02.

The method for the mixed gas experiments is as follows: powdered samples of the material to be studied are first compacted to pressed chips (20 to 40 mesh), weighed accurately, then loaded into the adsorber. The sample is activated by passing helium gas through it at some elevated temperature, less than or equal to 250° C. The sample is then cooled to the desired temperature, and the test gas (usually synthetic air) is analyzed. The test gas at some fixed, known pressure is then passed through the adsorbent sample until equilibrium is achieved, i.e., when the compositions of the gas entering and leaving the adsorber are identical. Then the adsorber is isolated, and the rest of the apparatus is prepared for the transfer and analysis of the gas from the adsorber. The total gas mixture is cryompumped from the adsorber (both the gas phase and the adsorbed phase). The cryopumped gas is warmed to ambient temperature and analyzed. The amount and composition of the adsorbed phase are calculated by difference from the corresponding data for the total mixture and that contained in the gas phase at equilibrium. After the adsorption measurements, the solid sample is removed from the adsorber and weighed again.

The adsorption of synthetic air (20.95 percent oxygen in nitrogen) is measured on a purchased sample of $Co_2[Fe(CN)_6]\cdot 5H_2O$. The "as received" powder is pressed into discs at 5600 psi; these discs are broken into chips and a mesh fraction through 20 onto 40 mesh is retained for testing. Adsorption data are measured after each of three activations performed with the sample in place. In each case, the sample chips are purged with flowing helium for 16 hours at temperatures of 100°, 128°, and 132° C., respectively. The separation factor changed very little with the extent of activation, but there were increases in the loadings after the second activation. During the adsorption step, the approach to equilibrium was followed by analyzing the effluent gas from the adsorber. At the air flow rate used (30 cubic centimeters per minute), the time allowed for adsorption (1.5 hours) was more than sufficient to achieve equilibrium.

Gas adsorption data for some hexacyano compounds can be found in Table II. Adsorbent preparation and data can be found in Tables III through VI.

Hydrated $Zn_2[Fe(CN)_6]$ polycrystalline powders have been prepared by several methods using various reagents and conditions. The most common synthesis is described below. Deviations from this "standard" procedure are mentioned in Table III under "Comments".

The standard synthesis is based on the precipitation of an insoluble hydrate by rapid mixing of reagents soluble in an aqueous medium, specifically:

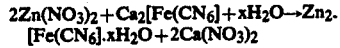

$$2Zn(NO_3)_2 + Ca_2[Fe(CN)_6] + xH_2O \rightarrow Zn_2[Fe(CN)_6]\cdot xH_2O + 2Ca(NO_3)_2$$

Values of x=2 to 2.5 are typical of samples showing superior adsorption performance. Values of "x" are determined from the difference in weight of the sample in air-dried and vacuum-activated states. The standard reagents are $Zn(NO_3)_2\cdot 6H_2O$ and $Ca_2[Fe(CN)_6]\cdot(10$ to $11)H_2O$ in aqueous solution at the concentrations 0.4M and 0.1M, respectively. The dissolved salts are filtered before use. The volumes of these solutions are 300 cubic centimeters and 150 cubic centimeters, respectively, so that the ratio of moles $Zn^{2+}$ to moles $[Fe(CN)_6]^{4-}$ is kept at four times the stoichiometric value. Either deionized water (pH=5.5 to 6) or tap water (pH=6.5 to 7) are used for these solutions, and the preparations are performed at ambient temperature.

Precipitation occurs as streams of the reagent solutions are mixed in the throat of a funnel. The precipitate is stirred in the mother liquor until it is filtered. After the initial filtration, the precipitate is washed by blending with water, then it is filtered again. Ordinarily three such washing-filtrations are performed. The final filter cake is dried in air for 16 hours at 50° C. For convenience, the dried filter cake is usually crushed and screened, and the −20+40 mesh fraction retained for adsorption testing.

An investigation of the effect of $Ca_2[Fe(CN)_6]$ source on sorptive properties is made. This reagent is obtained from three suppliers in different purities.

Hydrated $Zn_3[Fe(CN)_6]_2$ polycrystalline powders are prepared using apparatus the same as and techniques similar to those used in the preparation of $Zn_2[Fe(CN)_6]$. The standard synthesis is based on the following chemistry:

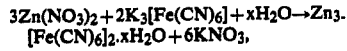

$$3Zn(NO_3)_2 + 2K_3[Fe(CN)_6] + xH_2O \rightarrow Zn_3[Fe(CN)_6]_2\cdot xH_2O + 6KNO_3,$$

where values of x less than 1 mole are typical. Specific values of synthesis variables and changes in the methods and conditions are presented in Table IV. As indicated in Table IV, it is possible by slow diffusion to prepare relatively large crystals (preparation #4) whose adsorption rates are not significantly slower than the rates of samples composed of much smaller crystals. Samples prepared by "rapid mixing" use the same precipitation method as that for $Zn_2[Fe(CN)_6]$. For "dropwise" addition, the anion reagent is added dropwise to a solution of the cation reagent. "Slow diffusion" denotes a method in which the usual reagent solutions are separated by a water barrier through which the reacting ions diffuse to form the precipitate.

Hydrated crystals of Ce(III) [Fe(II)(CN)$_6$] are prepared by precipitation and crystallization methods that are formally similar to the syntheses for $Zn_2[Fe(CN)_6]$ and $Zn_3[Fe(CN)_6]_2$. The synthesis chemistry is based on:

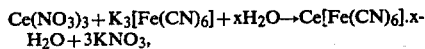

$$Ce(NO_3)_3 + K_3[Fe(CN)_6] + xH_2O \rightarrow Ce[Fe(CN)_6] \cdot xH_2O + 3KNO_3,$$

where values of x greater than or equal to 4.0 are typical.

Specific values of synthesis variables and comments on the methods and conditions are given in Table V. The precipitation/crystallization rates for Ce[Fe(CN)$_6$] are observably slower than those of the two Zn compounds, and the rates for Ce[Fe(CN)$_6$] decrease perceptibly from rapid precipitation to slow crystallization as the reagent concentrations decrease. Relatively large crystals are prepared easily. As indicated in Table V, the effect of Ce reagent purity and the effect of precipitation rate on adsorption performance are studied.

Hydrated hexacyanometalates other than $Zn_2[Fe(CN)_6]$, $Zn_3[Fe(CN)_6]_2$, and Ce(III)[Fe(III)(CN)$_6$] are prepared as crystalline powders by methods similar to those used for the two Zn compounds. The principle of precipitating an insoluble hydrate from an aqueous mixture of soluble salts is retained, but the chemistry has been modified to suit the various compositions. For example, divalent transition metal hexacyanometalate (III) compounds are synthesized according to the reaction:

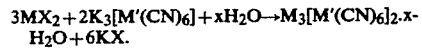

$$3MX_2 + 2K_3[M'(CN)_6] + xH_2O \rightarrow M_3[M'(CN)_6]_2 \cdot xH_2O + 6KX.$$

Here M is the divalent metal, M' is the metal in oxidation state (III), and X represents chloride or nitrate. Values of x vary considerably with M and M'. Reagents are chosen so that the ratio M/M' exceeds the value corresponding to stoichiometry. The general methods by which the precipitates are obtained and comments specific to the individual preparations are set out in Table VI.

The preparations in Table VI designated by quotation marks correspond to attempts to make mixed phase samples containing both [Fe(CN)$_6$]$^{4-}$ and [Fe(CN)$_6$]$^{3-}$ ions. The preparations designated by "Zn$_3$[Fe(CN)$_6$]$_2$" are made by methods used for pure Zn$_3$[Fe(CN)$_6$]$_2$ samples; those designated "Zn$_2$[Fe(CN)$_6$]" are made according to pure Zn$_2$[Fe(CN)$_6$] methods. Both the "Zn$_3$[Fe(CN)$_6$]$_2$" and "Zn$_2$[Fe(CN)$_6$]" preparations exhibit O$_2$ selectivity, but the adsorptive properties are accounted for by physical mixture of pure phases observed in the x-ray diffraction patterns of the mixtures.

The adsorbent materials require activation for use in either pressure swing or temperature swing adsorption separation processes. Such activation involves the removal of some water of hydration, which varies with composition with values in the range 0.3 to 21 percent of the activated weight. Activations can be accomplished by standard methods such as heating while purging the adsorbent with gas or vacuum pumping of the adsorbent bed.

From the tabular summaries, it can be seen that many hexacyano compounds of transition elements exhibit O$_2$ selectivity. Among those, four compounds show combinations of adsorbent properties of special practical interest. The Zn$_2$[Fe(CN)$_6$] compound has good O$_2$ loadings (0.20 to 0.25 mmol/g) and very low N$_2$ loadings that lead to the highest separation factors for an air feed (11 to 120). The sorption rates are moderate, as indicated by the O$_2$ adsorption at 1000 torr (60 to 84 percent of equilibrium in 10 minutes). The Zn$_3$[Fe(CN)$_6$]$_2$ compound also has good O$_2$ loadings, but the N$_2$ loadings are higher, so that lower separation factors are obtained (1.36 to 1.75). The sorption rates are very fast (95 to 97 percent of equilibrium in 1 minute), comparable to those of zeolites. The Co$_2$[Fe(CN)$_6$] compound has similar rates (90 percent of equilibrium in 1 minute) and higher separation factors (2 to 3), but the O$_2$ loading is about half those of the Zn compounds. Note that the separation factor obtained with synthetic air (2.17) compares very favorably with the value (2.23) obtained with pure gases on the same sample. This experimental result is considered conclusive evidence of the O$_2$ selectivity of these adsorbents. The Ce(III)[Fe(III)(CN)$_6$] compound has very high O$_2$ loadings (0.42 to 0.56 mmol/g) and good separation factors (10 to 48 at 10 minutes). For this material, the separation factor is calculated as a function of time, because the sorption of N$_2$ requires very long times to reach equilibrium (hours to days). The intrinsic O$_2$ sorption rates for Ce[Fe(CN)$_6$] (59 to 84 percent of equilibrium in 10 minutes) are similar to those of Zn$_2$[Fe(CN)$_6$], but the uptake is about twice as high for the Ce compound because the equilibrium loading is higher.

The data presented in Tables III to VI show that the sorptive properties of the hexacyano compounds for O$_2$ and N$_2$ depend on the method of preparation. From Table III, it can be seen that Zn$_2$[Fe(CN)$_6$] materials having O$_2$ loadings and separation factors superior to those of commercial Zn$_2$[Fe(CN)$_6$] (Table II) can be made, when the proper [Fe(CN)$_6$]$^{4-}$ reagent solution is used. From Table IV, it is apparent that the N$_2$ loading and separation factors of Zn$_3$[Fe(CN)$_6$]$_2$ are sensitive to the purity of the reagents and the way in which they are brought together for reaction. From Table V, it is evident that Ce[Fe(CN)$_6$] samples having the fastest O$_2$ uptakes are those prepared at the lower reagent concentrations and with high Ce reagent purity.

TABLE I

| PHYSICAL PROPERTIES OF SOME HEXACYANO ADSORBENTS | | | | |
|---|---|---|---|---|
| ACTIVATED COMPOSITION | SOURCE | BET N$_2$ SURFACE AREA (M$^2$/G) | WEIGHT LOST ON ACTIVATION (Wt. %) | HYDRATED CRYSTAL DENSITY (G/CM$^3$) |
| Zn$_2$[Fe(CN)$_6$] | * | 29 | 17.35 | |

TABLE I-continued
PHYSICAL PROPERTIES OF SOME HEXACYANO ADSORBENTS

| ACTIVATED COMPOSITION | SOURCE | BET $N_2$ SURFACE AREA ($M^2/G$) | WEIGHT LOST ON ACTIVATION (Wt. %) | HYDRATED CRYSTAL DENSITY ($G/CM^3$) |
|---|---|---|---|---|
| | PREPARATION #14 (III) | 58 | 13.99 | 1.78 |
| $Zn_3[Fe(CN)_6]_2$ | PREPARATION #1 (IV) | 664 | 1.69 | 1.50 |
| $Co_2[Fe(CN)_6]$ | * | 146 | 30.14 | 2.12 |
| $Co_3[Co(CN)_6]_2$ | * | 434 | 39.43 | 1.74 |
| $Cu_3[Co(CN)_6]_2$ | PREPARATION #11 (VI) | 399 | 21.22 | 1.79 |

NOTES:
* indicates that the component is obtained from an outside commercial source.
"Preparation #" or "Preparation number" indicate that the composition is prepared as provided in this specification.
Parenthetical expression indicates Table number.
$M^2/G$ = square meters per gram.
Wt % = percent by weight
$G/CM^3$ = grams per cubic centimeter
BET = Brunauer-Emmett-Teller and refers to the method of measuring surface area pioneered by these men.

TABLE II
GAS ADSORPTION DATA FOR HEXACYANO COMPOUNDS

| Compound | Temp (°C.) | $O_2$ 1000 Torr | $N_2$ 1000 Torr | $N_2$ 3779 Torr | Ar 1000 Torr | $CO_2$ 150 Torr | Separation Factor $O_2/N_2$ | In 1 Min. | $O_2$ Uptake at 1000 Torr (mmol/g) In 10 Min. |
|---|---|---|---|---|---|---|---|---|---|
| $Zn_2[Fe(CN)_6]$ | | | | | | | | | |
| * | 23-28 | 0.157 | 0.014 | 0.046 | 0.021 | 0.459 | 12.9 | (0.046) | 0.094 |
| PREPARATION #1 (III) | 22-23 | 0.238 | 0.004 | 0.016 | 0.005 | 0.504 | 56.1 | 0.066 | 0.167 |
| PREPARATION #4 (III) | 22-23 | 0.233 | | 0.021 | | | 41.9 | 0.077 | 0.171 |
| PREPARATION #14 (III) | 23-25 | 0.239 | | 0.027 | | | 33.4 | 0.073 | 0.194 |
| $Zn_3[Fe(CN)_6]_2$ | | | | | | | | | |
| PREPARATION #1 (IV) | 22 | 0.210 | 0.145 | 0.467 | | 0.416 | 1.70 | 0.204 | 0.210 |
| $Co_2[Fe(CN)_6]$ | | | | | | | | | |
| * | 22-23 | 0.110 | 0.058 | 0.191 | 0.096 | 0.261 | 2.17 | 0.100 | 0.108 (5 Min.) |
| * | 22 | 0.099** | | 0.165** | | | 2.28** | | |
| $Co_3[Co(CN)_6]_2$ | | | | | | | | | |
| * | 22-26 | 0.132 | 0.117 | 0.370 | 0.135 | 0.615 | 1.35 | 0.126 | 0.130 (8 Min.) |
| $Cu_3[Co(CN)_6]_2$ | | | | | | | | | |
| PREPARATION #11 (VI) | 19-20 | 0.297 | 0.287 | 0.818 | 0.309 | 1.073 | 1.37 | | |
| $Ce[Fe(CN)_6]$ | | | | | | | | | |
| PREPARATION #15 (V) | 22-23 | 0.529 0.410 (10 min) | | 0.368 0.099 (10 min) | | | 5.4 15.6 (10 min) | 0.169 | 0.410 |

NOTES:
mmol/g = millimoles per gram
°C. = degrees Celcius
Min. = minutes
** = refers to mixed gas adsorption data. The mixed gases are 21 percent $O_2$ in $N_2$.

TABLE III
ADSORBENT PREPARATION AND DATA ($Zn_2[Fe(CN)_6]$)

| PREPARATION NUMBER | REAGENT MOLE RATIO Zn/Fe (STOICH. = 1) | WATER SOURCE | COMMENTS, IF ANY, WITH RESPECT TO REAGENTS, CONCENTRATIONS, METHODS, T, pH, DOPANTS, OR ADDITIVES | AMOUNT ADSORBED AT AMBIENT TEMPERATURE (MMOL/G) | | | CALCULATED SEPARATION FACTOR |
|---|---|---|---|---|---|---|---|
| | | | | $O_2$ at 1000 torr At Equil. | In 10 Min. | $N_2$ at 3779 Torr At Equil. | |
| 1 | 2.5 | De-Ionized | | 0.238 | 0.167 | 0.016 | 56.1 |
| 2 | 1.0 | De-Ionized | | 0.205 | 0.159 | 0.070 | 11.0 |
| 3 | 2.5 | Tap | | 0.225 | 0.173 | 0.022 | 38.6 |
| 4 | 4.0 | Tap | | 0.233 | 0.171 | 0.021 | 41.9 |
| 5 | 2.5 | Tap | $Ca_2[Fe(CN)_6]$ pH = 8 to 9 with $Ca(OH)_2$ | 0.216 | 0.166 | 0.027 | 30.2 |
| 6 | 4.0 | Tap | Hexacyano Soln. Doped with 3 mol % $K_3[Co(CN)_6]$ | 0.238 | 0.192 | 0.024 | 37.4 |
| 7 | 4.0 | Tap | $Ca_2[Fe(CN)_6]$ Added Dropwise to $Zn(NO_3)_2$ | 0.240 | 0.160 | 0.011 | 82.3 |
| 8 | 4.0 | Tap | PPT. Boiled 1.5 Hrs. in Mother Liquor | 0.245 | 0.176 | 0.014 | 66.0 |
| 9 | 4.0 | Tap | $Zn(NO_3)_2$ Doped with 3 mol % $Co(NO_3)_2$ | 0.229 | 0.182 | 0.025 | 34.6 |
| 10 | 4.0 | Tap | $Mg_2[Fe(CN)_6]$ | 0.244 | 0.155 | 0.008 | 115.1 |
| 11 | 4.0 | Tap | Hexacyano Soln. Doped with 6 mol % $K_3[Co(CN)_6]$ | 0.227 | 0.190 | ≦0.027 | ≦31.7 |
| 12 | 4.25 | De-Ionized | 0.8 PPM $CuCl_2$ Added to $H_2O$ Before use | 0.241 | 0.183 | 0.015 | 61.8 |
| 13 | 1.7 | Tap | PPT. Boiled 20 Min. in Mother Liquor | 0.244 | 0.187 | 0.033 | 27.9 |
| 14 | 4.25 | Tap | | 0.239 | 0.194 | 0.027 | 33.4 |
| 15 | 4.0 | Tap | Zn Soln. Doped with 10 mol % $Cd(NO_3)_2$ | 0.235 | 0.128 | 0.013 | 68.2 |
| 16 | 4.0 | Tap | $Mg_2[Fe(CN)_6]$; PPT. Boiled in Mother Liquor 1.75 Hrs. | 0.218 | 0.175 | 0.063 | 13.0 |
| 17 | 4.0 | Tap | Zn Soln. Doped with 20 mol % $Cd(NO_3)_2$ | 0.209 | 0.142 | 0.025 | 31.5 |
| 18 | 4.0 | Tap | PPT. Washed with De-Ionized $H_2O$ | 0.231 | 0.185 | 0.024 | 36.3 |
| 19 | 4.25 | Tap | PPT. Boiled in Mother Liquor 6 Hrs. | 0.217 | 0.181 | 0.039 | 21.0 |
| 20 | 4.25 | Tap | Prepn. Performed at 40° C. | 0.191 | 0.131 | 0.014 | 58.5 |
| 21 | 4.25 | Tap | Reagents Prepared at 0° C., Precipn. at 23-25° C. | 0.226 | 0.145 | 0.006 | 120.1 |
| 22 | 4.0 | Tap | Water pH 5 By Adding $HNO_3$ Before Use | 0.247 | 0.161 | 0.022 | 38.8 |
| 23 | 4.0 | Tap | $Mg_2[Fe(CN)_6]$ and $ZnSO_4$ | 0.236 | 0.173 | 0.015 | 62.1 |
| 24 | 4.0 | Tap | Fluka $Ca_2[Fe(CN)_6]$ + $HNO_3$ to After Color Change; pH 6.5 | 0.230 | 0.150 | 0.013 | 68.4 |
| 25 | 3.9 | Tap | $Mg_2[Fe(CN)_6]$; Low: $[Zn^{2+}] = 0.129$ M, $[Fe(CN)_6^{4-}] = 0.033$ M | 0.226 | 0.161 | 0.011 | 78.9 |
| 26 | 4.0 | "Decationized" | $H^+$ Substituted for Cations in $H_2O$, pH 5 | 0.236 | 0.152 | 0.011 | 77.5 |
| 27 | 4.0 | "Decationized" | Same as 26, but $ZnSO_4$ and $Mg_2[Fe(CN)_6]$ | 0.255 | 0.178 | 0.012 | 74.2 |
| 28 | 4.0 | De-Ionized | But Tap $H_2O$ for $Ca_2[Fe(CN)_6]$ Soln. | 0.235 | 0.183 | 0.021 | 42.2 |
| 29 | 4.0 | Tap | $ZnCl_2$ | 0.220 | 0.172 | 0.028 | 29.6 |
| 30 | 4.0 | De-Ionized | $Ca_2[Fe(CN)_6]$ Soln. "Aged" 5 Days Before Use | 0.216 | 0.182 | ≦0.067 | ≅12.2 |
| 31 | 4.0 | Tap | $Ca_2[Fe(CN)_6]$ Soln. "Aged" 6 Days Before Use | 0.252 | 0.165 | 0.011 | 86.4 |
| 32 | 4.0 | Tap | Fluka $Ca_2[Fe(CN)_6]$ Soln. + $CO_2$ Filtered, pH = 5.5 | 0.269 | 0.178 | ≦0.014 | ≦72.4 |
| 33 | 4.0 | De-Ionized | $Ca_2[Fe(CN)_6]$ Soln. "Aged" 3 Days in Bright Light | 0.255 | 0.163 | 0.010 | 96.2 |
| 34 | 4.0 | De-Ionized | $Ca_2[Fe(CN)_6]$ Soln. "Aged" 4 Days in Darkness | 0.250 | 0.189 | 0.016 | 59.0 |
| 35 | 4.0 | Tap | DeGussa $Ca_2[Fe(CN)_6]$ | 0.195 | 0.155 | ≅0.037 | ≅19.6 |
| 36 | 1.0 | De-Ionized | $K_4[Fe(CN)_6]$ | 0.107 | | 0.097(a) | |
| 37 | 2.5 | De-Ionized | | 0.131 | 0.068 | 0.044 | 11.2 |
| 38 | 1.5 | De-Ionized | | 0.174 | 0.131 | 0.113 | 5.81 |
| 39 | 3.0 | De-Ionized | PPT. Washed for Extensive Time in Blender | | 0.050 | | |
| 40 | 2.5 | De-Ionized | Resin Beds Flushed for 20 Min. Before Use | 0.149 | 0.102 | 0.048 | 11.7 |
| 41 | 3.0 | Tap | $K_4[Fe(CN)_6]$; ACS Certified Reagents | 0.120 | 0.073 | 0.101 | 4.48 |
| 42 | 4.0 | De-Ionized | Water pH = 7 by Adding $Ca(OH)_2$ | 0.170 | 0.138 | 0.092 | 6.97 |
| 43 | 4.0 | De-Ionized | $Ca_2[Fe(CN)_6]$ pH = 7 with $Ca(OH)_2$; Resin Beds Flushed; Dry PPT. | | 0.126 | | |
| 44 | 4.0 | Tap | Zn Soln. Doped with 3 mol % $Cu(NO_3)_2$ | 0.149 | 0.106 | 0.077 | 7.30 |
| 45 | 4.25 | De-Ionized | 20 PPM $CaCO_3$ Added to Water Before Use | 0.180 | 0.141 | 0.093 | 7.30 |

TABLE III-continued
ADSORBENT PREPARATION AND DATA ($Zn_2[Fe(CN)_6]$)

| PREPARATION NUMBER | REAGENT MOLE RATIO Zn/Fe (STOICH. = 1) | WATER SOURCE | COMMENTS, IF ANY, WITH RESPECT TO REAGENTS, CONCENTRATIONS, METHODS, T, pH, DOPANTS, OR ADDITIVES | AMOUNT ADSORBED AT AMBIENT TEMPERATURE (MMOL/G) | | | CALCULATED SEPARATION FACTOR |
|---|---|---|---|---|---|---|---|
| | | | | $O_2$ at 1000 torr At Equil. | In 10 Min. | $N_2$ at 3779 Torr At Equil. | |
| 46 | 4.0 | Tap | Hexacyano Soln. Doped with 3 mol % $K_3[Fe(CN)_6]$ | 0.118 | | 0.075 | 5.94 |
| 47 | 0.75 | Tap | $Ca_2[Fe(CN)_6]$ Added Dropwise to $Zn(NO_3)_2$ | 0.124 | 0.087[b] | 0.271 | 1.73 |
| 48 | 4.25 | De-Ionized | 0.8 PPM $CuCl_2$ Added to Water Before Use | 0.151 | | 0.064 | 8.90 |
| 49 | 1.72 | Tap | High Reagent Concns: $[Zn^{2+}] = 1.4$, $[Fe(CN)_6^{4-}] = 0.4$ | ≅0.112 | | 0.186 | ≅2.27 |
| 50 | 1.72 | Tap | Same as 49 but Solns. Mixed by Slow Diffusion | ≅0.148 | | ≅0.140 | (3.99) |
| 51 | 4.0 | Distilled | Water Boiled Before Use | 0.118 | | 0.041 | 10.85 |
| 52 | 4.0 | De-Ionized | 36 PPM NaCl + 42 PPM $MgSO_4$ + $H_2O$ Before Use | 0.154[c] | | 0.056[c] | 10.38[c] |
| 53 | 4.0 | Tap | Fluka $Ca_2[Fe(CN)_6]$ + $HNO_3$ to Color Change | 0.093 | 0.030[b] | 0.072 | 4.82 |
| 54 | 4.0 | Tap | Fluka $Ca_2[Fe(CN)_6]$ + $HNO_3$ to Before Color Change | 0.092 | 0.030[b] | 0.061 | 8.91 |
| 55 | 4.25 | Tap | $H_4[Fe(CN)_6]$; PPT into $Ca(OH)_2$ | 0.144 | 0.106 | 0.052 | 7.98 |
| 56 | 4.0 | Tap | $Zn(C_2H_3O_2)_2$ | 0.110 | 0.091 | | |
| 57 | 2.0 | De-Ionized | $K_4[Fe(CN)_6]$; PPT. Not Washed After Filtration | 0.015 | | 0.009[a] | |
| 58 | 2.0 | De-Ionized | $ZnSO_4$ and $K_4[Fe(CN)_6]$ | 0.0 | | 0.0[a] | |
| 59 | 2.0 | De-Ionized | $ZnCl_2$ | 0.0 | | 0.0[a] | |
| 60 | 2.0 | De-Ionized | $K_4[Fe(CN)_6]$ | 0.066 | | | 1.87 |
| 31 | 4.0 | Tap | $Ca_2[Fe(CN)_6]$ Soln. "Aged" 6 Days Before Use | 0.252 | 0.165 | 0.011 | 86.4 |
| 32 | 4.0 | Tap | Fluka $Ca_2[Fe(CN)_6]$ Soln. + $CO_2$, Filtered, pH = 5.5 | 0.269 | 0.178 | ≅0.014 | ≅72.4 |
| 33 | 4.0 | De-Ionized | $Ca_2[Fe(CN)_6]$ Soln. "Aged" 3 Days in Bright Light | 0.255 | 0.163 | 0.010 | 96.2 |
| 34 | 4.0 | De-Ionized | $Ca_2[Fe(CN)_6]$ Soln. "Aged" 4 Days in Darkness | 0.250 | 0.189 | 0.016 | 59.0 |
| 35 | 4.0 | Tap | DeGussa $Ca_2[Fe(CN)_6]$ | 0.195 | 0.155 | ≅0.037 | ≅19.6 |
| 36 | 1.0 | De-Ionized | $K_4[Fe(CN)_6]$ and $ZnSO_4$ | 0.107 | | 0.097[a] | |
| 37 | 2.5 | De-Ionized | | 0.131 | 0.068 | 0.044 | 11.2 |
| 38 | 1.5 | De-Ionized | PPT. Washed for Extensive Time in Blender | 0.174 | 0.131 | 0.113 | 5.81 |
| 39 | 3.0 | De-Ionized | | | 0.050 | | |
| 40 | 2.5 | Tap | Resin Beds Flushed for 20 Min. Before Use | 0.149 | 0.102 | 0.048 | 11.7 |
| 41 | 3.0 | Tap | $K_4[Fe(CN)_6]$; ACS Certified Reagents | 0.120 | 0.073 | 0.101 | 4.48 |
| 42 | 4.0 | De-Ionized | Water pH = 7 by Adding $Ca(OH)_2$ | 0.170 | 0.138 | 0.092 | 6.97 |
| 43 | 4.0 | De-Ionized | $Ca_2[Fe(CN)_6]$ pH = 7 with $Ca(OH)_2$; Resin Beds Flushed; Dry PPT. | | 0.126 | | |
| 44 | 4.0 | Tap | Zn Soln. Doped with 3 mol % $Cu(NO_3)_2$ | 0.149 | 0.106 | 0.077 | 7.30 |
| 45 | 4.25 | De-Ionized | 20 PPM $CaCO_3$ Added to Water Before Use | 0.180 | 0.141 | 0.093 | 7.30 |
| 46 | 4.0 | Tap | Hexacyano Soln. Doped with 3 mol % $K_3[Fe(CN)_6]$ | 0.118 | | 0.075 | 5.94 |
| 47 | 0.75 | Tap | $Ca_2[Fe(CN)_6]$ Added Dropwise to $Zn(NO_3)_2$ | 0.124 | 0.087[b] | 0.271 | 1.73 |
| 48 | 4.25 | De-Ionized | 0.8 PPM $CuCl_2$ Added to Water Before Use | 0.151 | | 0.064 | 8.90 |
| 49 | 1.72 | Tap | High Reagent Concns: $[Zn^{2+}] = 1.4$, $[Fe(CN)_6^{4-}] = 0.4$ | ≅0.112 | | 0.186 | ≅2.27 |
| 50 | 1.72 | Tap | Same as 49 but Solns. Mixed by Slow Diffusion | ≅0.148 | | ≅0.140 | (3.99) |
| 51 | 4.0 | Distilled | Water Boiled Before Use | 0.118 | | 0.041 | 10.85 |
| 52 | 4.0 | De-Ionized | 36 PPM NaCl + 42 PPM $MgSO_4$ + $H_2O$ Before Use | 0.154[c] | | 0.056[c] | 10.38[c] |
| 53 | 4.0 | Tap | Fluka $Ca_2[Fe(CN)_6]$ + $HNO_3$ to Color Change | 0.093 | 0.030[b] | 0.072 | 4.82 |
| 54 | 4.0 | Tap | Fluka $Ca_2[Fe(CN)_6]$ + $HNO_3$ to Before Color Change | 0.092 | 0.030[b] | 0.061 | 8.91 |
| 55 | 4.25 | Tap | $H_4[Fe(CN)_6]$; PPT into $Ca(OH)_2$ | 0.144 | 0.106 | 0.052 | 7.98 |
| 56 | 4.0 | Tap | $Zn(C_2H_3O_2)_2$ | 0.110 | 0.091 | | |
| 57 | 2.0 | De-Ionized | $K_4[Fe(CN)_6]$; PPT. Not Washed After Filtration | 0.015 | | 0.009[a] | |
| 58 | 2.0 | De-Ionized | $ZnSO_4$ and $K_4[Fe(CN)_6]$ | 0.0 | | 0.0[a] | |
| 59 | 2.0 | De-Ionized | $ZnCl_2$ | 0.0 | | 0.0[a] | |
| 60 | 2.0 | De-Ionized | $K_4[Fe(CN)_6]$ | 0.066 | | | 1.87 |

TABLE III-continued

ADSORBENT PREPARATION AND DATA ($Zn_2[Fe(CN)_6]$)

| PREPARATION NUMBER | REAGENT MOLE RATIO Zn/Fe (STOICH. = 1) | WATER SOURCE | COMMENTS, IF ANY, WITH RESPECT TO REAGENTS, CONCENTRATIONS, METHODS, T, pH, DOPANTS, OR ADDITIVES | AMOUNT ADSORBED AT AMBIENT TEMPERATURE (MMOL/G) | | | CALCULATED SEPARATION FACTOR |
|---|---|---|---|---|---|---|---|
| | | | | $O_2$ at 1000 torr At Equil. | In 10 Min. | $N_2$ at 3779 Torr At Equil. | |
| 61 | 0.5 | De-Ionized | PPT. Aged in Mother Liquor 91 Hrs. Before Filtering | 0.0 | | 0.0(a) | |
| 62 | 2.0 | De-Ionized | PPT. Filtered Immediately | 0.004 | | | |
| 63 | 2.0 | De-Ionized | | 0.061 | 0.054 | 0.073 | 3.17 |
| 64 | 2.0 | De-Ionized | Blender Not Used for Washing PPT. | 0.014 | 0.009 | | |
| 65 | 1.5 | De-Ionized | $Na_4[Fe(CN)_6]$, Lit. Meth, PPT. Boiled | 0.010 | 0.006 | | |
| 66 | 3.0 | De-Ionized | | 0.003 | 0.002 | | |
| 67 | 2.5 | De-Ionized | $Na_4[Fe(CN)_6]$, Lit. Meth, PPT. Boiled | 0.006 | | <0.001(d) | |
| 68 | 3.0 | Tap | Hexacyano Soln. Doped with 3 mol % $K_3[Cr(CN)_6]$ | <0.001(d) | | 0.0 | |
| 69 | 4.0 | Tap | Zn Soln. Doped with 10 mol % $Ce(NO_3)_3$ | 0.0 | | 0.071 | 2.98 |
| 70 | 4.0 | Tap | Zn Soln. Doped with 10 mol % $AgNO_3$ | 0.056 | 0.033 | 0.037(e) | |
| 71 | 4.0 | De-Ionized | Water Boiled Before Use | | | 0.011(f) | |
| 72 | 4.0 | De-Ionized | 57 PPM $CaSO_4$ added to $H_2O$ Before Use | 0.054(f) | | ≥0.056 | ≤4.45 |
| 73 | 4.0 | Tap | Prepn. Performed at 0° C. | 0.066 | | | |
| 74 | 4.25 | Tap | Min. Vol. $H_2O$ Solns. Mixed with Glycerol, Then PPTD. | 0.0 | | 0.0 | |
| 75 | | | $OH^-$ for Anions, $HNO_3$ Added to pH = 6 | 0.071 | 0.015 | 0.105 | 2.55 |
| 76 | 4.0 | "De-Anionized" | $Zn(NO_3)_2$ in $CH_3OH$ + $Ca_2[Fe(CN)_6]$ + $H_2O$ | 0.033 | | 0.028 | 4.45 |
| 77 | | | | 0.048 | 0.044 | 0.077 | 2.35 |

NOTES FOR TABLES III TO VI:
STOICH. or Stoich. = stoichiometry
MMOL/G = millimoles gas per gram adsorbent
Equil. = equilibrium
Soln. = solution
% = percent
PPM = parts per million
Prepn. = preparation
Precipn. = precipitation
Fluka = Tridom/Fluka Chemical Incorporated
M = molar
DeGussa = DeGussa Corporation
atm = atmospheres
Molycorp = Union Molycorp
ACS = American Chemical Society
Hrs. = hours
Min. Vol. = minimum volume
PPT = precipitated
T = time
(a)At 1000 Torr
(b)In 1 Minute
(c)For White Part of Dry Filter Cake
(d)In First 5 Minutes
(e)In 10 Minutes
(f)After 55 Minutes

TABLE IV

ADSORBENT PREPARATION AND DATA ($Zn_3[Fe(CN)_6]_2$)

| PREPN. NUMBER | WATER SOURCE | CATION/ANION REAGENT RATIO OF MOLES (STOICH. = 1.0) | CATION/ANION REAGENT RATIO OF CONCENTRATIONS | REAGENT ADDITON METHOD | TREATMENT OF PRECIPITATE |
|---|---|---|---|---|---|
| 1 | Tap | 1.3 | 1.0 | Dropwise | Not Boiled |
| 2 | Tap | 4.0 | 4.0 | Rapid Mix | Not Boiled |
| 3 | Tap | 1.3 | 1.0 | Dropwise | Not Boiled |
| 4 | Tap | 1.3 | 1.0 | Slow Diffusion | Not Boiled Large Crystals |
| 5 | Tap | 2.5 | 2.5 | Rapid Mix | Boiled |
| 6 | Tap | 1.3 | 1.0 | Dropwise | Boiled |
| 7 | Tap | 1.3 | 1.0 | Dropwise | Boiled |
| 8 | Tap | 2.5 | 2.5 | Rapid Mix | Boiled |
| 9 | Tap | 2.5 | 2.5 | Rapid Mix | Boiled |
| 10 | Tap | 2.5 | 2.5 | Rapid Mix | Boiled |
| 11 | Tap | 2.5 | 2.5 | Rapid Mix | Boiled |
| 12 | Tap | 2.5 | 2.5 | Rapid Mix | Boiled |
| 13 | De-ionized | 1.3 | 1.0 | Dropwise | Boiled |
| 14 | De-ionized | 1.3 | 1.0 | Dropwise | Boiled |
| 15 | Tap | 1.3 | 1.0 | Dropwise | Boiled |
| 16 | De-ionized | 1.3 | 1.0 | Rapid Mix | Boiled |
| 17 | De-ionized | 1.3 | 1.0 | Rapid Mix | Boiled |
| 18 | De-ionized | 1.3 | 1.0 | Dropwise | Boiled |
| 19 | De-ionized | 1.3 | 4.2 | Dropwise | Boiled |
| 10 | De-ionized | 3.9 | 6.0 | Rapid Mix | Boiled |
| 21 | De-ionized | 1.3 | 2.0 | Dropwise | Boiled |

| PREPN. NUMBER | COMMENTS | AMOUNT (MMOL/G) ADSORBED AT AMBIENT TEMP. $O_2$ AT 1000 TORR AT EQUIL. | AMOUNT (MMOL/G) ADSORBED AT AMBIENT TEMP. $O_2$ AT 1000 TORR AT (T) MIN. | $N_2$ AT 3779 TORR AT EQUIL. | CALCULATED SEPARATION FACTOR |
|---|---|---|---|---|---|
| 1 | | 0.210 | 0.208 (2.5) | 0.467 | 1.70 |
| 2 | | 0.176 | 0.176 (10) | 0.432 | 1.53 |
| 3 | | 0.225 | 0.220 (2.5) | 0.494 | 1.75 |
| 4 | | 0 196 | 0.189 (1) | 0.473 | 1.56 |
| 5 | | 0.208 | 0.199 (1) | 0.464 | 1.69 |
| 6 | $Zn(NO_3)$ doped with 3 mol % $MnSO_4$ | 0.204 | 0.194 (1) | 0.476 | 1.62 |
| 7 | $K_3[Fe(CN_6]$ doped with 3 mol % $K_3[Co(CN)_6]$ | 0.209 | 0.199 (1) | 0.464 | 1.70 |
| 8 | $Zn(NO_3)_2$ doped with 1 mol % $Cu(NO_3)_2$ | 0.215 | 0.208 (1) | 0.497 | 1.63 |
| 9 | $Zn(NO_3)_2$ doped with 3 mol % $Cu(NO_3)_2$ | 0.213 | 0.206 (1) | 0.516 | 1.56 |
| 10 | $Zn(NO_3)_2$ doped with 10 mol % $Cu(NO_3)_2$ | 0.209 | 0.200 (1) | 0.605 | 1.30 |
| 11 | $Zn(NO_3)_2$ doped with 3 mol % $Ni(NO_3)_2$ | 0.192 | 0.189 (2.5) | 0.529 | 1.37 |
| 12 | $Zn(NO_3)_2$ doped with 10 mol % $Ni(NO_3)_2$ | 0.191 | 0.182 (1) | 0.529 | 1.36 |
| 13 | Rapid Stirring | 0.206 | 0.197 (1) | 0.467 | 1.66 |
| 14 | Rapid Stirring | 0.212 | 0.202 (1) | 0.708 | 1.13 |
| 15 | Rapid Stirring | 0.217 | 0.208 (1) | 0.681 | 1.20 |
| 16 | Rapid Stirring | 0.213 | 0.203 (1) | 0.585 | 1.37 |
| 17 | Slow Stirring | 0.211 | 0.203 (1) | 0.530 | 1.50 |
| 18 | Slow Stirring | 0.208 | 0.200 (1) | 0.576 | 1.36 |
| 19 | Slow Stirring | 0.204 | 0.196 (1) | 0.465 | 1.65 |
| 20 | Slow Stirring | 0.204 | 0.201 (1) | 0.536 | 1.47 |
| 21 | Slow Stirring | 0.215 | 0.207 (1) | 0.448 | 1.66 |

TABLE V

ADSORBENT PREPARATION AND DATA ($Ce[Fe(CN)_6]$)

| PREPN. NUMBER | REAGENT MOLE RATIO Ce/Fe (STOICH. = 1.0) | REAGENT CONCENTRATIONS $[Ce]^{3+}$ | REAGENT CONCENTRATIONS $[Fe(CN)_6]^{3-}$ | PRECIPITATION RATE | COMMENTS ALL PREPARATIONS USE FISHER PURIFIED $Ce(NO_3)_3$ UNLESS STATED OTHERWISE |
|---|---|---|---|---|---|
| 1 | 2.0 | 0.6M | 0.3M | Slow | De-ionized $H_2O$ used for all prepn's, large crystals |
| 2 | 3.0 | 0.9M | 0.3M | Slow | Large Crystals |
| 3 | 1.0 | 0.3M | 0.3M | Slow | Crystals obtained by evaporation |
| 4 | 2.0 | 0.6M | 0.3M | Slow | Large Crystals |
| 5 | 2.0 | 0.6M | 0.3M | Slow | 50% $(Ce(NO_3)_3)$ solution from Molycorp (Bastnasite), large crystals |
| 6 | 2.0 | 0.6M | 0.3M | Slow | 95% $Ce(NO_3)_3$ solution from Molycorp, large crystals |

TABLE V-continued
ADSORBENT PREPARATION AND DATA (Ce[Fe(CN)$_6$])

| | | | | | |
|---|---|---|---|---|---|
| 7 | 2.0 | 0.6M | 0.3M | Slow | 10x scale-up of #1, large crystals, 3% yield |
| 8 | — | — | — | — | #7 re-washed and re-tested |
| 9 | — | — | — | Slow | Second crop yield from #7 by evaporation, large crystals, 23% yield |
| 10 | 2.0 | 2.0M | 1.0M | Rapid | 50% Ce(NO$_3$)$_3$ Molycorp solution, fine crystals |
| 11 | 2.0 | 2.0M | 1.0M | Rapid | 95% Ce(NO$_3$)$_3$ Molycorp solution, fine crystals |
| 12 | 2.0 | 0.6M | 0.3M | Slow | 10x scale-up of #1, large crystals, 31% yield |
| 13 | — | — | — | Slow | Second crop from #12 by evaporation, large crystals, 36% yield |
| 14 | 2.0 | 2.0M | 1.0M | Rapid | Fine crystals |
| 15 | 2.0 | 0.6M | 0.3M | Slow | 20x scale-up of #1, large crystals, 17% yield |
| 16 | — | — | — | Slow | Second crop from #15 by evaporation, large crystals, 34% yield |
| 17 | 2.0 | 0.6M | 0.3M | Slow | 99.9% Ce(NO$_3$)$_3$ Molycorp solution, large crystals |
| 18 | 2.0 | 2.0M | 1.0M | Rapid | 99.9% Ce(NO$_3$)$_3$ Molycorp solution, fine crystals |
| 19 | 2.0 | 0.6M | 0.3M | Slow | 10x scale-up of #1, large crystals, no washing, 21.7% yield |
| 20 | — | — | — | Slow | Second crop from #19 by evaporation, large crystals, 18% yield |

| | AMOUNT (MMOL/G) ADSORBED AT AMBIENT TEMP. | | | CALCULATED SEPARATION |
|---|---|---|---|---|
| PREPN. NUMBER | O$_2$ AT 1000 TORR AT EQUIL. | AT 10 MIN. | N$_2$ AT 3779 TORR AT 10 MIN. | FACTOR AT 10 MIN. |
| 1 | 0.563 | 0.378 | 0.069 | 20.6 |
| 2 | 0.483 | 0.367 | 0.100 | 13.8 |
| 3 | 0.535 | 0.418 | 0.116 | 13.6 |
| 4 | 0.424 | 0.315 | 0.086 | 13.8 |
| 5 | 0.488 | 0.294 | 0.063 | 17.5 |
| 6 | 0.539 | 0.389 | 0.097 | 15.1 |
| 7 | 0.511 | 0.427 | 0.115 | 10.4 |
| 8 | 0.544 | 0.391 | 0.099 | 14.9 |
| 9 | 0.558 | 0.445 | 0.113 | 14.8 |
| 10 | 0.498 | 0.232 | 0.018 | 47.6 |
| 11 | 0.490 | 0.298 | 0.061 | 18.4 |
| 12 | 0.558 | 0.424 | 0.110 | 14.5 |
| 13 | 0.555 | 0.423 | 0.101 | 15.8 |
| 14 | 0.525 | 0.206 | 0.032 | 24.3 |
| 15 | 0.529 | 0.410 | 0.099 | 15.6 |
| 16 | 0.554 | 0.397 | 0.098 | 14.3 |
| 17 | 0.549 | 0.403 | 0.088 | 17.3 |
| 18 | 0.521 | 0.307 | 0.035 | 33.1 |
| 19 | 0.551 | 0.343 | 0.077 | 16.8 |
| 20 | 0.478 | 0.375 | 0.099 | 14.3 |

NOTE: Fisher Purified Ce(NO$_3$)$_3$ is a salt sold by the Fisher Scientific Company designated as purified.

TABLE VI
ADSORBENT PREPARATION AND DATA (VARIOUS METAL HEXACYANOMETALATES)
PREPARATION PROCEDURES

| Composition | Prep. # | Method | Comments | AMOUNT (MMOL/G) ADSORBED AT AMBIENT TEMP. | | | CALCULATED SEPARATION FACTOR |
|---|---|---|---|---|---|---|---|
| | | | | O$_2$ at 1000 Torr at Equil. | at (T) Min. | N$_2$ at 3779 Torr at Equil. | |
| Ca$_2$[Fe(CN)$_6$] | * | | | 0.000 | | | |
| Mn$_2$[Fe(CN)$_6$] | * | | Second Activation; N$_2$ Pressure = 1000 Torr | 0.032 | | 0.026 | |
| Fe$_4$[Fe(CN)$_6$]$_3$ | * | | | 0.114 | | 0.059 | 7.24 |
| Co$_2$[Fe(CN)$_6$] | * | | | 0.110 | 0.109 (5) | 0.191 | 2.17 |
| Co$_2$[Fe(CN)$_6$] | * | | Mixed-Gas Adsorption: 20.95% O$_2$ in N$_2$, 6.2 atm | 0.099 | | 0.165 | 2.28 |
| Co$_2$[Fe(CN)$_6$] | 1 | Rapid Mixing | Co/Fe = 4.0, Tap H$_2$O | 0.017 | 0.017 (10) | 0.031 | 2.0 |
| Co$_2$[Fe(CN)$_6$] | 2 | Rapid Mixing | Co/Fe = 4.0, Tap H$_2$O | 0.046 | 0.042 (1) | 0.061 | 2.9 |
| Ni$_2$[Fe(CN)$_6$] | * | | Gas Pressures = 300 Torr; Irreversible Sorption | 0.029 | | 0.005 | |
| Cu$_2$[Fe(CN)$_6$] | * | | | 0.140 | | 0.420 | 1.26 |
| Zn$_2$[Fe(CN)$_6$] | * | | Chips (20 to 40 Mesh) from Pressed Discs | 0.157 | 0.098 (10) | 0.051 | 12.9 |

TABLE VI-continued
ADSORBENT PREPARATION AND DATA (VARIOUS METAL HEXACYANOMETALATES)
PREPARATION PROCEDURES

| Composition | Prep. # | Method | Comments | $O_2$ at 1000 Torr at Equil. | at (T) Min. | $N_2$ at 3779 Torr at Equil. | CALCULATED SEPARATION FACTOR |
|---|---|---|---|---|---|---|---|
| $Zn_2[Fe(CN)_6]$ | * | | Powder (Same as lot above) | 0.164 | | 0.043 | 14.5 |
| $Cd_2[Fe(CN)_6]$ | * | | | 0.006 | | 0.013 | 1.6 |
| $Cs_4[Fe(CN)_6]$ | * | | | 0.000 | | 0.000 | |
| $Ba_2[Fe(CN)_6]$ | * | | | 0.000 | | 0.000 | |
| $Pb_2[Fe(CN)_6]$ | * | | | 0.000 | | | |
| $Cu_3[Fe(CN)_6]_2$ | 3 | Rapid Mixing | (Cu + Zn)/Fe = 2.5, Tap $H_2O$, Precipitate Boiled | 0.168 | 0.163 (1) | 0.494 | 1.29 |
| $Cu_{2.4}Zn_{0.6}[Fe(CN)_6]_2$ | 4 | Rapid Mixing | (Cu + Zn)/Fe = 2.5, Tap $H_2O$, Precipitate Boiled | 0.165 | 0.161 (1) | 0.494 | 1.26 |
| $Co_{2.6}Zn_{0.4}[Fe(CN)_6]_2$ | 5 | Rapid Mixing | (Co + Zn)/Fe = 2.5, Tap $H_2O$, Precipitate Boiled | 0.157 | 0.151 (1) | 0.416 | 1.42 |
| $Co_{1.8}Zn_{1.2}[Fe(CN)_6]_2$ | 6 | Rapid Mixing | (Co + Zn)/Fe = 2.5, Tap $H_2O$, Precipitate Boiled | 0.148 | 0.139 (1) | 0.377 | 1.48 |
| $K_3[Co(CN)_6]$ | * | | Crystals Ground to Powder; $N_2$ Pressure = 1000 Torr | 0.000 | | 0.000 | |
| $Mn_3[Co(CN)_6]_2$ | 7 | Rapid Mixing | Mn/Co = 3.0, De-Ionized $H_2O$ | 0.191 | 0.191 (17) | 0.616 | 1.17 |
| $Fe_3[Co(CN)_6]_2$ | 8 | Rapid Mixing | Fe/Co = 3.0, De-Ionized $H_2O$ | 0.159 | 0.159 (33) | 0.348 | 1.72 |
| $Fe[Co(CN)_6]$ | 9 | Rapid Mixing | Fe/Co = 3.0, De-Ionized $H_2O$ Slow Precipitation; Slow Rates | 0.045 | | | |
| $Co_3[Co(CN)_6]_2$ | * | | | 0.132 | 0.132 (8) | 0.370 | 1.35 |
| $Ni_3[Co(CN)_6]_2$ | 10 | Rapid Mixing | Ni/Co = 3.0, De-Ionized $H_2O$ Rates Slow and Irreproducible | 0.200 | | | |
| $Cu_3[Co(CN)_6]_2$ | 11 | Rapid Mixing | Cu/Co = 4.5, De-Ionized $H_2O$ | 0.297 | 0.297 (27) | 0.818 | 1.37 |
| $Cu_3[Co(CN)_6]_2$ | 12 | Rapid Mixing | Cu/Co = 4.5, De-Ionized $H_2O$ (Repeat of #57) | 0.295 | 0.295 (20) | 0.837 | 1.33 |
| $Cu_3[Co(N)_6]_2$ | 13 | Slow Diffusion | Cu/Co = 4.5, De-Ionized $H_2O$ Larger Crystals, Slow Rates | 0.27 | | 0.20 (a) | |
| $Zn_3[Co(CN)_6]_2$ | 14 | Rapid Mixing | Zn/Co = 2.37, De-Ionized $H_2O$ | 0.173 | 0.173 (13) | 0.492 | 1.29 |
| $Mn_3[Cr(CN)_6]_2$ | 15 | Rapid Mixing | Mn/Cr = 3.0, De-Ionized $H_2O$ | 0.165 | 0.165 (9) | 0.491 | 1.27 |
| $Fe_3[Cr(CN)_6]_2$ | 16 | Rapid Mixing | Fe/Cr = 3.0, De-Ionized $H_2O$ $O_2$ Slow | 0.184 | 0.121 (10) | 0.253 | 2.74 |
| $Ni_3[Cr(CN)_6]_2$ | 17 | Rapid Mixing | Ni/Cr = 3.0, De-Ionized $H_2O$ $O_2$ Slow | 0.18 | 0.08 (10) | 0.17 | 4 |
| $Cu_3[Cr(CN)_6]_2$ | 18 | Rapid Mixing | Cu/Cr = 3.0, De-Ionized $H_2O$ | 0.05 | 0.05 (10) | 0.124 | 1.5 |
| $Zn_3[Cr(CN)_6]_2$ | 19 | Rapid Mixing | Zn/Cr = 3.0, De-Ionized $H_2O$ | 0.152 | 0.150 (2.5) | 0.424 | 1.35 |
| $Co_3[Mn(CN)_6]_2$ | 20 | Rapid Mixing | Co/Mn = 3.0, Tap $H_2O$ | 0.128 | 0.121 (1) | 0.321 | 1.50 |
| $Zn_3[Mn(CN)_6]_2$ | 21 | Rapid Mixing | Zn/Mn = 3.0, Tap $H_2O$ | 0.137 | 0.133 (1) | 0.374 | 1.38 |
| "$Zn_3[Fe(CN)_6]_2$" | 22 | Rapid Mixing | Zn/Fe = 2.5, Tap $H_2O$, Precipitate Boiled, $K_3[Fe(CN)_6]$ + 25 mol % $Ca_2[Fe(CN)_6]$ | 0.196 | 0.188 (1) | 0.514 | 1.44 |
| "$Zn_3[Fe(CN)_6]_2$" | 23 | Rapid Mixing | Zn/Fe = 2.5, Tap $H_2O$, Precipitate Boiled, $K_3[Fe(CN)_6]$ + 50 mol % $Ca_2[Fe(CN)_6]$ | 0.160 | 0.152 (1) | 0.532 | 1.13 |
| "$Zn_3[Fe(CN)_6]_2$" | 24 | Rapid Mixing | Zn/Fe = 2.5, Tap $H_2O$, Precipitate Boiled, $K_3[Fe(CN)_6]$ + 10 mol % $Ca_2[Fe(CN)_6]$ | 0.195 | 0.188 (1) | 0.465 | 1.58 |
| "$Zn_2[Fe(CN)_6]$" | 25 | Rapid Mixing | Zn/Fe = 4.25, Tap $H_2O$, $Ca_2[Fe(CN)_6]$ + 25 mol % $K_3[Fe(CN)_6]$ | 0.214 | 0.119 (10) | 0.108 | 7.46 |
| "$Zn_2[Fe(CN)_6]$" | 26 | Rapid Mixing | Zn/Fe = 4.25, Tap $H_2O$, $Ca_2[Fe(CN)_6]$ + 10 mol % $K_3[Fe(CN)_6]$ | 0.236 | 0.092 (10) | 0.039 | 22.8 |
| "$Zn_2[Fe(CN)_6]$" | 27 | Rapid Mixing | Zn/Fe = 4.25, Tap $H_2O$, $Ca_2[Fe(CN)_6]$ + 50 mol % $K_3[Fe(CN)_6]$ | 0.189 | 0.125 (10) | 0.218 | 3.27 |
| $Al_4[Fe(CN)_6]_3$ | 28 | Gelatinization | Al/Fe = 1.3 (Stoich. = 1.0), De-Ionized $H_2O$ | 0.045 | | 0.022 | 7.7 |
| $Ce_4[Fe(CN)_6]_3$ | 29 | Slow Precipitation | Ce/Fe = 2.0 (Stoich. = 1.0), use $Ca_2[Fe(CN)_6]$ | 0.013 | | 0.031 | 1.6 |
| $Ce_4[Fe(CN)_6]_3$ | 30 | Slow Precipitation | Ce/Fe = 2.0 (Stoich. = 1.0), use $K_4[Fe(CN)_6]$ | 0.0 | | 0.0 | |
| $La_4[Fe(CN)_6]_3$ | 31 | Slow Precipitation | La/Fe = 2.0 (Stoich. = 1.0), De-Ionized $H_2O$ | 0.0 | | 0.0 | |
| $Sn_2[Fe(CN)_6]$ | 32 | Rapid Mixing | Sn/Fe = 1.0 (Stoich. = 1.0), De-Ionized $H_2O$ | 0.012 | 0.007 (10) | 0.02 (10) | 1.2 (10 min) |
| $Sn[Fe(CN)_6]$ | 33 | Rapid Mixing | Sn/Fe = 2.0 (Stoich. = 1.0), De-Ionized $H_2O$ | 0.010 | 0.002 (10) | 0.004 | 9.4 |
| $Cr[Fe(CN)_6]$ | 34 | Slow Precipitation | Cr/Fe = 2.0 De-Ionized $H_2O$ | 0.0 | | 0.0 | |
| $La[Fe(CN)_6]$ | 35 | Slow Precipitation | La/Fe = 2.0, De-Ionized $H_2O$ | 0.074 | 0.064 (10) | 0.278 | 1.0 |
| $Pr[Fe(CN)_6]$ | 36 | Rapid Precipi- | Pr/Fe = 2.0, De-Ionized $H_2O$ | 0.490 | 0.202 (10) | 0.022 | 34.6 |

TABLE VI-continued
ADSORBENT PREPARATION AND DATA (VARIOUS METAL HEXACYANOMETALATES)
PREPARATION PROCEDURES

| Composition | Prep. # | Method | Comments | AMOUNT (MMOL/G) ADSORBED AT AMBIENT TEMP. | | | CALCULATED SEPARATION FACTOR |
|---|---|---|---|---|---|---|---|
| | | | | $O_2$ at 1000 Torr at Equil. | at (T) Min. | $N_2$ at 3779 Torr at Equil. | |
| $Pr[Fe(CN)_6]$ | 37 | Slow Precipitation | Pr/Fe 2 | | | 0.034 (10 min) | 23.2 (10 min) |
| $Sc[Fe(CN)_6]$ | 38 | Slow Precipitation | Sc/Fe = 2.0, De-Ionized $H_2O$ | 0.034 | 0.018 (10) | 0.05 | 25.7 |
| $Y[Fe(CN)_6]$ | 39 | Rapid Precipitation | Y/Fe = 2.0, De-Ionized $H_2O$ | 0.359 | 0.034 (10) | 0.006 | 233 |
| $Y[Fe(CN)_6]$ | 40 | Slow Precipitation | Y/Fe = 2.0, De-Ionized $H_2O$ | 0.090 (100 min) | 0.030 (10) | 0.001 (10 min) | 86.5 (10 min) |
| $Ce[Co(CN)_6]$ | 41 | Slow Precipitation | Ce/Co = 2.0, De-Ionized $H_2O$ | 0.527 | 0.201 | 0.012 (10) | 64.7 (10 min) |
| $La[Co(CN)_6]$ | 42 | Slow Precipitation | La/Co = 2.0, De-Ionized $H_2O$ | 0.030 | 0.022 (10) | 0.068 | 1.67 |

We claim:

1. In a process for the separation of oxygen from a gas stream by adsorption, the improvement comprising using, as the adsorbent, a compound having the formula $M_x[M'(CN)_6]_y$
   wherein M is an element having an atomic number of 21, 25 to 30, 39, 50, or 57 to 59;
   M' is an element having an atomic number from 24 to 27; and
   x and y are positive whole numbers such that the sum of the valence of M times x plus the valence of $[M'(CN)_6]$ times y is equal to zero.

2. The process defined in claim 1 wherein the compound is $Zn_2[Fe(CN)_6]$.

3. The process defined in claim 1 wherein the compound is $Zn_3[Fe(CN)_6]_2$.

4. The process defined in claim 1 wherein the compound is $Co_2[Fe(CN)_6]$.

5. The process defined in claim 1 wherein the compound is $Ce(III)[Fe(III)(CN)_6]$.

* * * * *